(12) United States Patent
Shin et al.

(10) Patent No.: US 9,788,333 B2
(45) Date of Patent: Oct. 10, 2017

(54) D2D COMMUNICATION SYSTEM THAT USE THE NON-LICENSED BAND TO THE AUXILIARY BAND AND METHOD OF D2D SYSTEM THEREOF

(71) Applicant: SOONGSIL UNIVERSITY RESEARCH CONSORTIUM TECHNO-PARK, Seoul (KR)

(72) Inventors: Oh-Soon Shin, Seoul (KR); Hyeon Min Kim, Seoul (KR); Gil Mo Kang, Seoul (KR)

(73) Assignee: SOONGSIL UNIVERSITY RESEARCH CONSORTIUM TECHNO-PARK, Seoul (KR)

( * ) Notice: Subject to any disclaimer, the term of this patent is extended or adjusted under 35 U.S.C. 154(b) by 0 days.

(21) Appl. No.: 15/215,549

(22) Filed: Jul. 20, 2016

(65) Prior Publication Data
US 2017/0196013 A1  Jul. 6, 2017

(30) Foreign Application Priority Data
Dec. 30, 2015 (KR) ........................ 10-2015-0189998

(51) Int. Cl.
*H04W 16/14* (2009.01)
*H04W 72/08* (2009.01)
*H04W 76/02* (2009.01)
*H04W 72/04* (2009.01)

(52) U.S. Cl.
CPC ......... *H04W 72/082* (2013.01); *H04W 16/14* (2013.01); *H04W 72/0453* (2013.01); *H04W 76/023* (2013.01)

(58) Field of Classification Search
CPC ....... H04W 76/02; H04W 8/00; H04W 28/08; H04W 72/04; H04W 72/12; H04Q 7/24; H04B 17/00; H04L 12/56
See application file for complete search history.

(56) References Cited

U.S. PATENT DOCUMENTS

| | | | |
|---|---|---|---|
| 2003/0139136 A1* | 7/2003 | Pattabiraman | H04B 1/715 455/41.1 |
| 2012/0015607 A1* | 1/2012 | Koskela | H04W 76/023 455/62 |
| 2013/0016666 A1* | 1/2013 | Chen | H04W 72/1231 370/329 |

FOREIGN PATENT DOCUMENTS

KR  10-2014-0080298 A  6/2014

* cited by examiner

Primary Examiner — Thomas D Lee
Assistant Examiner — Frantz Bataille
(74) Attorney, Agent, or Firm — Revolution IP, PLLC

(57) ABSTRACT

Disclosed is a resource allocating method of a LTE-advanced based D2D communications system including a plurality of D2D terminals, the method comprising: by the D2D terminals, requesting a base station to allocate a licensed band and searching for a spectrum for usable non-licensed bands; generating a D2D communications link by using a resource of the licensed band that is allocated from the base station; calculating a signal to interference and noise ratio (SINR) of the D2D communications link; selecting at least one of resources of the searched non-licensed band when the signal to interference and noise ratio (SINR) is smaller than a threshold value; and performing D2D communications by using a resource of the selected non-licensed band.

8 Claims, 4 Drawing Sheets

[FIG. 1]
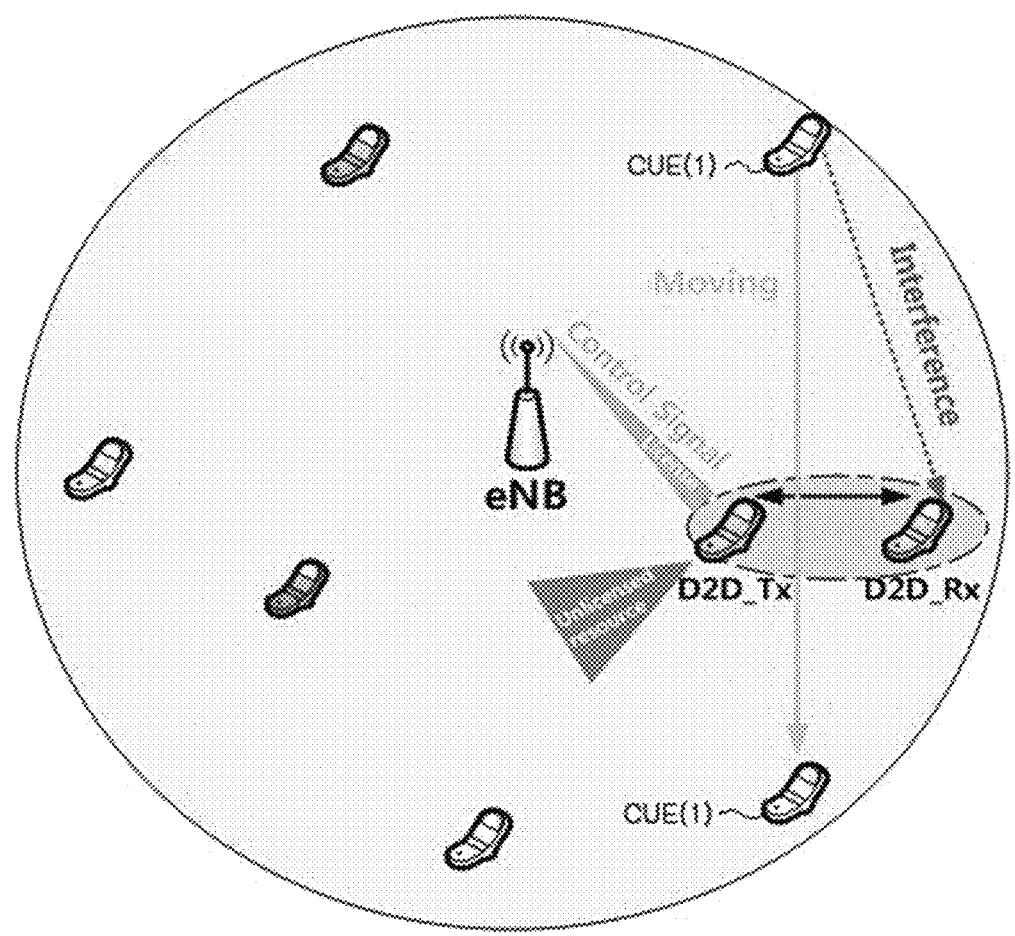

[FIG. 2]
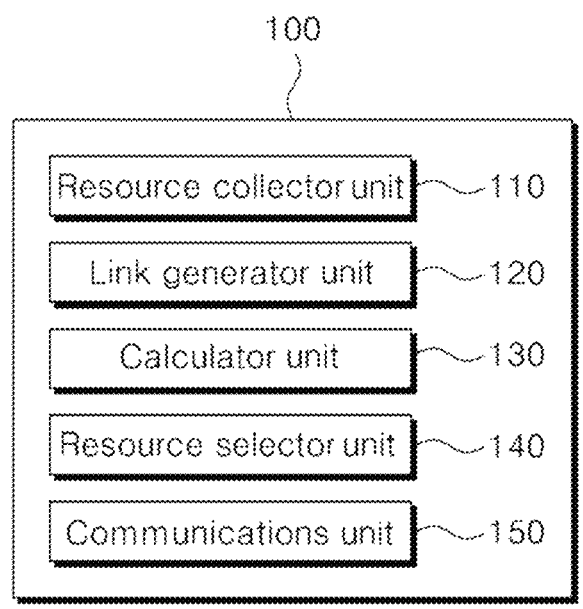

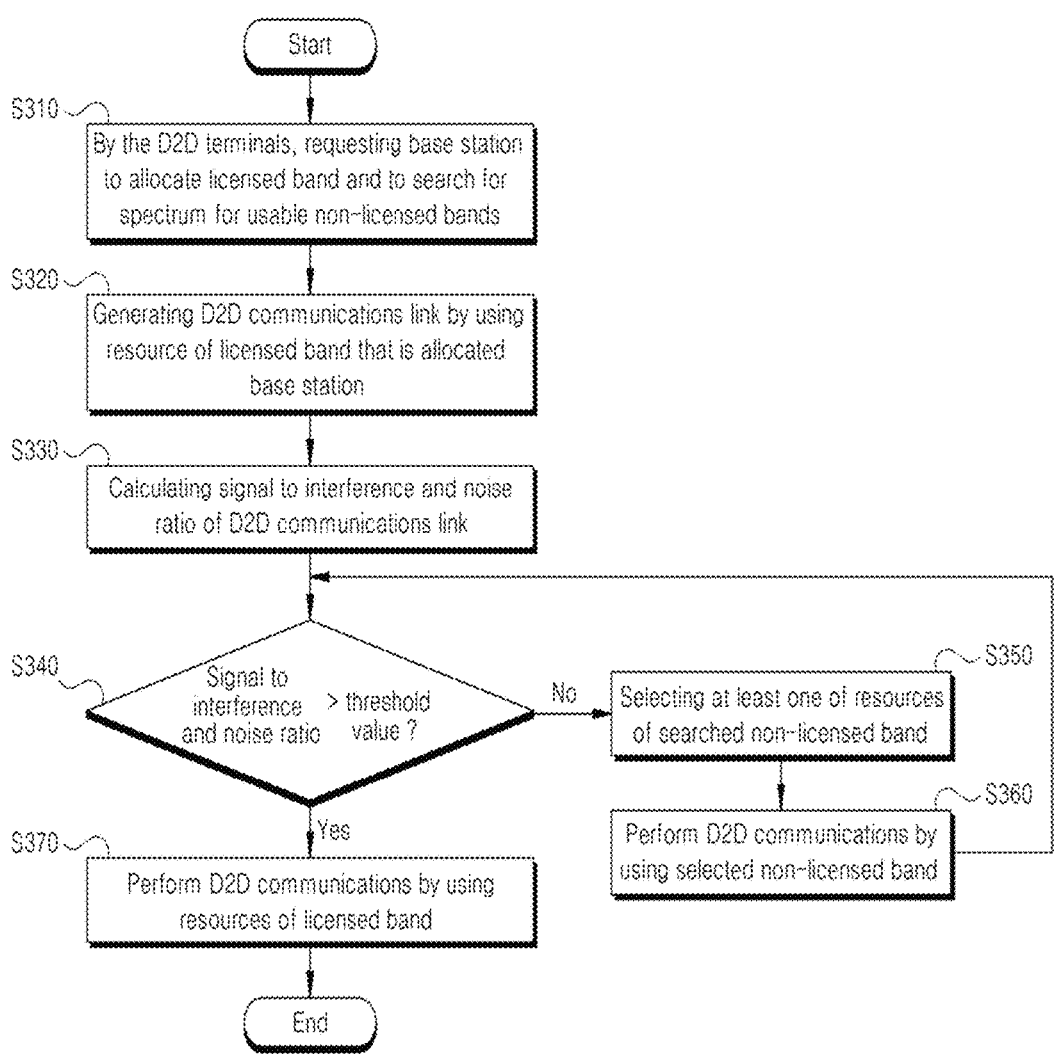

[FIG.4]
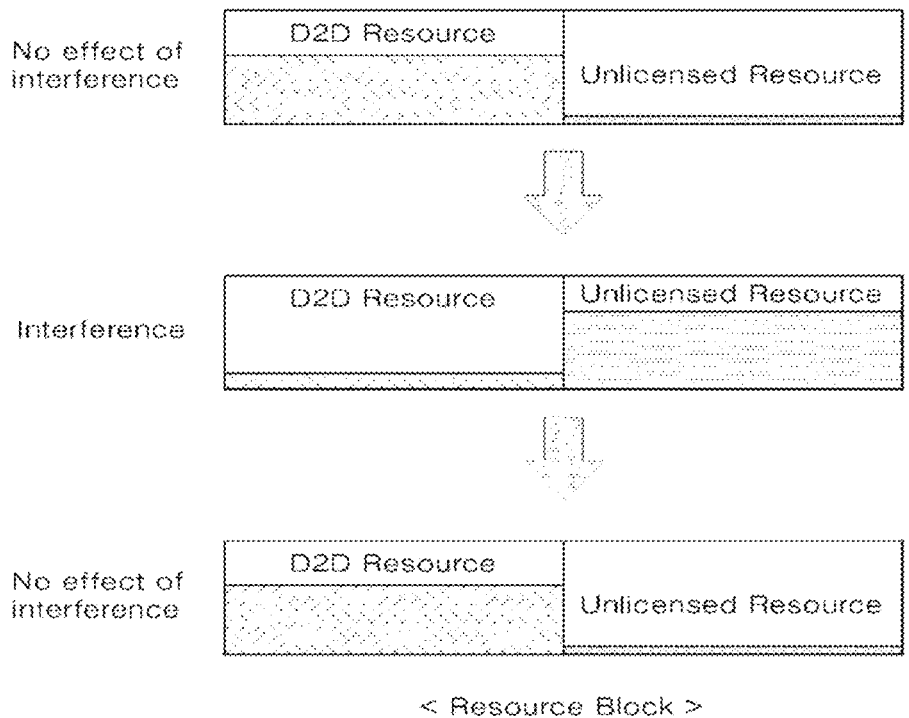
[FIG.5]
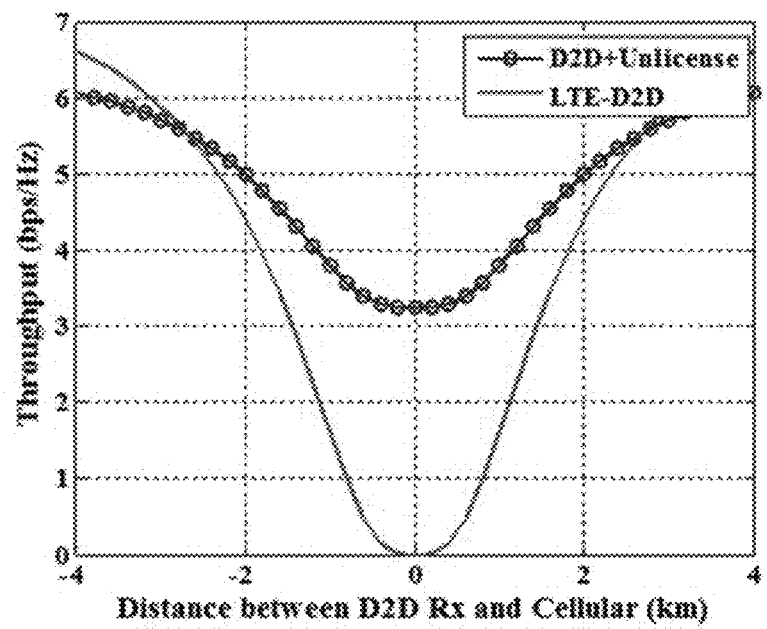

D2D COMMUNICATION SYSTEM THAT USE THE NON-LICENSED BAND TO THE AUXILIARY BAND AND METHOD OF D2D SYSTEM THEREOF

CROSS-REFERENCE TO RELATED APPLICATIONS

This application claims the priority of Korean Patent Application No. 10-2015-0189998 filed on Dec. 30, 2015, in the Korean Intellectual Property Office, the disclosure of which is incorporated herein by reference.

BACKGROUND OF THE INVENTION (a) Field of the Invention

The present invention relates to a D2D communications system and a D2D communication method, using a non-licensed band as an auxiliary band, and more particularly, to a D2D communications system and a D2D communication method, using a non-licensed band as an auxiliary band while allocating frequency resources which will be used for D2D communications between terminals sharing up and down frequency resources of a cellular network.

(b) Description of the Related Art

Device-to-device communications indicate direct communications between terminals that are locally adjacently located without using an infrastructure including base stations, and development and standardization of D2D communications techniques using licensed frequency bands have been in progress.

In a cellular system, when terminals located in an adjacent distance perform D2D communications, a base station may disperse loads, and the D2D terminals perform short-distance transmission, which reduces not only terminal power consumption but also transmission delay. Further, in terms of the whole system, conventional cellular terminals and the D2D terminals spatially re-use frequencies by sharing the same frequencies, thereby improving a frequency-using efficiency. In addition, the D2D communications may be used for relays between terminals, and are expected to generate new proximity-based services such as for collecting information related to stores and thinks located within an adjacent distance, for precise indoor measurement, for group communications between persons located within the adjacent distance, for network games, for location-based advertisements, or disaster communications.

Allocation of resources to be used in a D2D communications link is generally performed by selecting a resource that is least interfered from a cellular link while preventing performance deterioration of the cellular link. This allocating method is performed in a base station in a centralized type, and requires channel information of terminals and distance information. For example, according to an allocating method, D2D terminals located outside of the cell may use resources of a cellular terminal that is located sufficiently distantly from the D2D terminals.

However, according to such an allocating method, it is difficult to securely acquire channels through a resource-allocating algorithm since the allocating method does not consider scheduling variations and mobility of the cellular terminal. Besides, overhead may be generated in the whole system in the case of a D2D resource allocating method that adaptively re-allocates resources depending on a resource-allocating variation of the cellular terminal.

Accordingly, measures are required to prevent performance deterioration of the D2D terminals depending on terminal mobility, thus-channel variation, and resource-allocating scheduling variation in the resource allocation of cellular network based D2D communications techniques.

Background techniques of the present invention were disclosed in Korean Patent Laid-Open Publication No. 10-2014-0080298 (2014.06.30).

SUMMARY OF THE INVENTION

The present invention has been made in an effort to provide a D2D communications system and a D2D communication method, capable of using a non-licensed band as an auxiliary band while allocating frequency resources to be used for D2D communications between terminals sharing up and down frequency resources of a cellular network.

An exemplary embodiment of the present invention provides a resource allocating method of a LTE-advanced based D2D communications system including a plurality of D2D terminals, including: by the D2D terminals, requesting a base station to allocate a licensed band and searching for a spectrum for usable non-licensed bands; generating a D2D communications link by using a resource of the licensed band that is allocated from the base station; calculating a signal to interference and noise ratio (SINR) of the D2D communications link; selecting at least one of resources of the searched non-licensed band when the signal to interference and noise ratio (SINR) is smaller than a threshold value; and performing D2D communications by using a resource of the selected non-licensed band.

The resource of the licensed band that is allocated to the D2D terminal may be an $n^{th}$ cellular resource and is represented by a following equation.

$$k^* = \text{argmax } SINR_{RX}(k)$$

Herein, k* is a cellular resource which is allocated to the D2D terminal 100, argmax is a variable that accomplishes a maximum value, $SINR_{RX}(k)$ is the signal to interference and noise ratio of a D2D receiving terminal which re-uses the $n^k$ cellular resource.

In the calculating, the signal to interference and noise ratio (SINR) of the D2D receiving terminal that re-uses the $n^k$ cellular terminal may be calculated through a following equation.

$$SINR_{RX}(k) = \frac{H_D(k)d_D^{-a}P_D}{N + H_C(k)d_C^{-a}(k)P_C}$$

Herein, $P_C$ indicates a transmission power of a cellular terminal, $P_D$ indicates a transmission power of the D2D terminal 100, $H_D$ and $d_D^{-a}$ respectively indicate a D2D channel coefficient and a path loss, $H_C$ and $d_C^{-a}$ respectively indicate a channel coefficient and a path loss between the D2D terminal 100 and the cellular terminal, and N indicates a noise power.

The D2D terminal continuously may calculate the signal to interference and noise ratio (SINR) of the D2D communications link while performing communications by selecting and using a non-licensed band, and when the SINR of the communications link of the D2D terminal calculated for a predetermined time or a predetermined number of times is equal to or greater than a threshold value, the D2D terminal may perform D2D communications by using the resource of the licensed band that is allocated from the base station.

When the SINR of the communications link of the D2D terminal calculated for the predetermined time or the predetermined number of times is smaller than the threshold value, the D2D terminal may perform D2D communications by requesting the base station to allocate a new licensed band and using the new allocated licensed band.

Another exemplary embodiment of the present invention provides an LTE-advanced based D2D communications system including a plurality of D2D terminals, including: a resource collector configured to search for spectrums of usable non-licensed bands while the D2D terminals request a base station to allocate a licensed band to be used; a link generator configured to generate a D2D communications link by using a resource of the licensed band that is allocated from the base station; a calculator configured to calculate a signal to interference and noise ratio (SINR) of the D2D communications link; a resource selector configured to select at least one of resources of the searched non-licensed bands when the signal to interference and noise ratio (SINR) of the D2D communications link is smaller than a threshold value; and a communications unit configured to perform D2D communications by using a resource of the selected non-licensed band.

Advantageous Effects

According to the exemplary embodiments of the present invention, it is possible to reduce the performance deterioration of the D2D communications caused by temporal interference increase by using the resources of the non-licensed band as an auxiliary band, thereby increasing transmission speed of the D2D communications, service coverage, data processing capacity, and the like.

Further, the D2D communications can be used for a relay between terminals while improving a frequency-using efficiency, and can stably provide new proximity-based services such as for collecting information related to stores and thinks located within an adjacent distance, for precise indoor measurement, for group communications between persons located within the adjacent distance, for network games, for location-based advertisements, for communications between vehicles, or disaster communications.

BRIEF DESCRIPTION OF THE DRAWINGS

The above and other aspects, features and other advantages of the present invention will be more clearly understood from the following detailed description taken in conjunction with the accompanying drawings, in which:

FIG. 1 schematically illustrates a D2D communications system according to an exemplary embodiment of the present invention.

FIG. 2 is a schematic diagram illustrating a D2D terminal according to an exemplary embodiment of the present invention.

FIG. 3 is a flowchart illustrating a resource allocating method of a D2D communications system according to an exemplary embodiment of the present invention.

FIG. 4 schematically illustrates a resource block used by a D2D terminal according to an exemplary embodiment of the present invention.

FIG. 5 is a graph illustrating a performance evaluation of a resource allocating method of a D2D communications system according to an exemplary embodiment of the present invention.

DETAILED DESCRIPTION OF THE EMBODIMENTS

Hereinafter, embodiments of the present invention will be described with reference to the accompanying drawings in order for those skilled in the art to be able to implement it. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

The present invention will be described more fully hereinafter with reference to the accompanying drawings, in which exemplary embodiments of the invention are shown.

FIG. 1 schematically illustrates a D2D communications system according to an exemplary embodiment of the present invention.

As shown in FIG. 1, it is assumed that a base station eNB includes a pair of a D2D transmitting terminal D2D_Tx and a receiving terminal D2D_Rx located in an adjacent distance within a cellular network based single cell, and D2D communications links share frequency resources of cellular communications one to one.

Further, a centralized resource-allocating method in which appropriate resources are allocated to the D2D transmitting terminal D2D_Tx by the base station is employed, and it is assumed to ignore an interference that is affected to a cellular link by the D2D transmitting terminal D2D_Tx through an appropriate resource allocation.

In this situation, the D2D terminals D2D_Tx and D2D_Rx and a cellular terminal CUE(1) performs communications with each other by using same resources, and the performance of the D2D communications is affected by an interference generated to the D2D receiving terminal D2D_Tx by the cellular terminal CUE(1).

As shown in FIG. 1, when the cellular terminal CUE 1 moves cross a D2D communications link, it is difficult to secure the performance of the D2D communications due to an effect of the interference generated by the cellular terminal CUE(1).

In this situation, in the case of a general D2D system, the D2D terminals D2D_Tx and D2D_Rx re-ask the base station eNB for resources to be used for the D2D communications and perform the D2D communications through the resources re-asked from the base station eNB. In this case, the performance of the D2D communications may not be stably secured due to an additional delay time generated in operations from re-allocation of resources from the base station eNB to the communications using the reallocated resources, and may have a high possibility of significant deterioration.

In contrast, in the D2D communications system suggested in the present invention, when an interference is generated by movement of the cellular terminal CUE(1), the D2D terminal D2D_Tx can perform the D2D communications by using a non-licensed band capable of the D2D communications. In this case, the non-licensed band is temporally used. Accordingly, the use of the non-licensed band is possible for a delay time until the D2D communications using the allocated resources since an effect of the generated interference is weakened, or until the D2D communications is performed by using the resources that are re-allocated from the base station eNB.

As a result, the D2D communications system suggested in the present invention can reduce performance deterioration caused by the interference in the D2D communications by using a non-licensed band as auxiliary band, thereby providing a stable performance of the D2D communications.

Hereinafter, the D2D receiving terminal and the D2D transmitting terminal are not distinguished and are shared as the D2D terminal, and it is assumed that resource allocation of a licensed band for a D2D communications link is performed by a method of selecting resources that maximizes a signal to interference and noise ratio (SINR) under assumption that the D2D terminals all channel information related to an interference link as well as the communications link.

FIG. 2 is a schematic diagram illustrating a D2D terminal according to an exemplary embodiment of the present invention.

According to the present exemplary embodiment, a D2D terminal 100 includes a resource collector unit 110, a link generator unit 120, a calculator unit 130, a resource selector unit 140, and a communications unit 150.

First, the resource collector unit 110 requests a base station to allocate a licensed band that is to be used for the D2D communications or search for a spectrum for a non-licensed band. The resource collector unit 110 may sense a spectrum that is not used by a matched filter method, an energy detection method, or a character extraction method, or collect resource information of a non-licensed band that can be used for the D2D communications through a random connection method.

The resource collector unit 110 may search for a non-licensed band that can be continuously used according to a real-time or predetermined time distance or according to a predetermined condition. For example, when the signal to interference and noise ratio (SINR) of the D2D communications link using the licensed band calculated in the calculator unit 130 is equal to or greater than N, the resource collector unit 110 may search for the continuously used non-licensed band. When the SINR exceeds N, the resource collector unit 110 may not search for the non-licensed band. In this case, N is different from the predetermined threshold value compared in the calculator unit 130 and higher than the predetermined threshold value. Such settings may be easily modified later by a user.

Then, the link generator unit 120 generates a D2D communications link by using resources of a licensed band allocated from the base station.

Herein, the D2D communications link indicates an information transmitting path between D2D terminals 100 to perform the D2D communications.

The calculator unit 130 calculates the signal to interference and noise ratio (SINR) of the D2D communications link.

The calculator unit 130 calculates the signal to interference and noise ratio (SINR) of the D2D communications link using the resources of the licensed band in consideration of an interference that is given to the D2D receiving terminal by the cellular terminal. Then, the calculator unit 130 compares the calculated signal to interference and noise ratio (SINR) of the D2D communications link with a predetermined threshold value. In this case, the predetermined threshold value is a SINR that is guaranteed at a minimum for the D2D communications terminal to perform the D2D communications. When the calculated signal to interference and noise ratio (SINR) of the D2D communications link is greater than the predetermined threshold value, normal D2D communications are sufficiently possible.

When the performance of the D2D communications using the licensed band that is allocated from the base station is determined to be deteriorated, the resource selector unit 140 selects resources of a non-licensed band capable of D2D communications, collected in the resource collector unit 110.

Specifically, the resource selector unit 140 selects at least one of resources of the non-licensed band when the signal to interference and noise ratio (SINR) of the D2D communications link using the licensed band is equal to or smaller than the threshold value.

Next, the communications unit 150 performs the D2D communications by using the resources of the licensed band that is allocated from the base station or when the resources of the non-licensed band are selected by the resource selector unit 140, the communications unit 150 performs the D2D communications by using the selected resources of the non-licensed band.

FIG. 3 is a flowchart illustrating a resource allocating method of a D2D communications system according to an exemplary embodiment of the present invention.

First, the D2D terminal 100 requests a base station to allocate a licensed band and searches for a usable non-licensed band (S310).

The D2D terminal 100 may collect resource information of the non-licensed band that can be used for D2D communications through a spectrum sensing method or a random access method, and a collecting method is not limited thereto. The D2D terminal 100 may search for a non-licensed band or collect information related to the non-licensed band from the base station.

Then, the D2D terminal 100 generates a D2D communications link by using resources of the licensed band that is allocated from the base station (S320).

In this case, resource allocation of the licensed band for D2D terminal 100 is performed by selecting resources that maximize the signal to interference and noise ratio of the D2D communications link on the presumption that the D2D terminal recognizes all channel information related to an interference link as well as the communications link. For example, a resource of the licensed band that is allocated to the D2D terminal is an $n^{th}$ cellular resource and is represented by Equation 1.

$$k^* = \text{argmax } SINR_{RX}(k) \qquad \text{[Equation 1]}$$

Herein, k* is a cellular resource which is allocated to the D2D terminal 100, argmax is a variable that accomplishes a maximum value, and $SINR_{RX}(k)$ is the signal to interference and noise ratio of the D2D terminal 100.

Next, the D2D terminal 100 calculates the signal to interference and noise ratio (SINR) of the D2D communications link (S330).

The D2D terminal 100 calculates the signal to interference and noise ratio (SINR) for the case of using the resources of the licensed band allocated from the base station.

When the D2D terminal 100 re-uses the $n^{th}$ cellular resource, a signal to interference and noise ratio (SINR) in the D2D terminal 100 is calculated by using Equation 2.

$$SINR_{RX}(k) = \frac{H_D(k)d_D^{-a}P_D}{N + H_C(k)d_C^{-a}(k)P_C} \qquad \text{[Equation 2]}$$

Herein, $P_C$ indicates a transmission power of a cellular terminal, $P_D$ indicates a transmission power of the D2D terminal 100, $H_D$ and $d_D^{-a}$ respectively indicate a D2D channel coefficient and a path loss, $H_C$ and $d_C^{-a}$ respectively indicate a channel coefficient and a path loss between the D2D terminal 100 and the cellular terminal, and N indicates a noise power.

The D2D terminal 100 compares the signal to interference and noise ratio (SINR) of the D2D communications link with a predetermined threshold value (S340).

Herein, the predetermined threshold value is a SINR that is guaranteed at a minimum for the D2D communications terminal to perform the D2D communications, and may be easily modified by a user depending on a communications environment.

When the signal to interference and noise ratio (SINR) of the D2D communications link is smaller than the predetermined threshold value, the D2D terminal 100 selects the resources of the searched non-licensed band (S350).

The D2D terminal 100 determines that it is difficult to perform the D2D communications when the signal to interference and noise ratio (SINR) of the D2D communications link is smaller than the predetermined threshold value. Then, the D2D terminal 100 performs the D2D communications by selecting the resources of the non-licensed band (S360).

In this case, the D2D terminal 100 returns to step S330 while performing the D2D communications by using the selected non-licensed band, and calculates the signal to interference and noise ratio of the D2D communications link using the licensed band and goes to step S340. In other words, although performing the D2D communications by using the non-licensed band, the D2D terminal 100 can check whether the D2D communications are possible by using the resources of the licensed band allocated from the base station.

Further, when the signal to interference and noise ratio (SINR) of the D2D communications link is calculated to be greater than the predetermined threshold value, the D2D terminal 100 performs the D2D communications by using the resources of the existing licensed band (S370).

Meanwhile, when the signal to interference and noise ratio (SINR) of the D2D communications link is equal to the predetermined threshold value, the D2D terminal 100 may perform the D2D communications by using the resources of the non-licensed band or the resources of the existing licensed band depending on user settings.

In addition, the D2D terminal 100 sets a predetermined time or a number of times comparing the predetermined threshold value with the calculated signal to interference and noise ratio (SINR) of the D2D communications link. When the predetermined time or the number of times arrives, it is possible to request the base station to allocate resources of a new licensed band.

The resources of the non-licensed band may not use the D2D communications link at all times due to a maximum transmission time of the technical level, and thus the D2D terminal 100 may set a predetermined time or a number of times comparing the predetermined threshold value with the calculated signal to interference and noise ratio (SINR) of the D2D communications link, to correspond to a time at which the resources of the non-licensed band may not be used.

In other words, since an influence of the interference in the licensed band allocated from the base station is reduced, the D2D terminal 100 may set the number of times or the predetermined time by requesting checking whether the D2D communications can be performed using the licensed band and re-allocation of the licensed band from the base station and by considering the re-allocated time.

FIG. 4 schematically illustrates a resource block used by a D2D terminal according to an exemplary embodiment of the present invention.

In FIG. 4, a "D2D Resource" indicates a resource of a licensed band allocated from a base station, and an "Unlicensed Resource" indicates a resource of a non-licensed band that is usable for the D2D communications, collected by the D2D terminal 100.

As such, the D2D terminal 100 can virtualize two bands of resources into one resource through carrier aggregation (CA).

First, in the case that there is no influence of interference from cellular communications, the D2D terminal 100 performs communications by using the D2D Resource which is the licensed band allocated from the base station, and collect resources of the non-licensed band that can be used for D2D communications through a spectrum sensing method or a random access method.

In this case, when an interference situation is generated from the cellular communications, the D2D terminal 100 may not perform stable communications by using the D2D Resource. Accordingly, the D2D terminal 100 performs the D2D communications by using the resources of the non-licensed band that is usable in the collected D2D communications. However, the Unlicensed Resource may not be used for the D2D communications link at all times due to a maximum transmission time of the technical level, and thus is temporally used as an auxiliary resource in an situation in which an interference exists.

When the interference from the cellular communications disappears, the D2D terminal 100 performs the communications by using the D2D Resource which is the licensed band.

FIG. 5 is a graph illustrating a performance evaluation of a resource allocating method of a D2D communications system according to an exemplary embodiment of the present invention.

First, it is assumed that the D2D communications system according to the present exemplary embodiment allocates resources of a LTE licensed band to a D2D link, and allocates a 5 GHz non-licensed band having a same bandwidth as that of the LTE licensed band. Herein, the bandwidth of the resource block is set as 180 kHz based on a LTE having a 10 MHz bandwidth, and the resource block bandwidth of the non-licensed band is set identically to the LTE. Accordingly, the bandwidth virtualized through the carrier aggregation is 360 kHz.

It is assumed that a cellular terminal using same resources as those of the D2D link deflects from the D2D communications link at a speed of 100 km/h.

As shown in FIG. 5, a curve LTE-D2D indicates performance in the case of exclusively using frequency resources of the licensed band, and a curve D2D+Unlicense indicates performance of the D2D communications technique using the non-licensed band as the auxiliary band as suggested in the present invention.

In other words, FIG. 5 shows communications performance (Throughput (bps/Hz)) of a LTE D2D terminal according to a general resource allocating method and a resource allocating method suggested in the present invention depending on a distance between a D2D terminal and a cellular terminal which use a same licensed band (Distance between D2D Rx and Cellular (km)).

From the two curves of FIG. 5, it is seen that the performance is further improved as the distance between the D2D terminal and the cellular terminal is increased. As a result, when the D2D terminal and the cellular terminal are distant from each other, an interference is hardly generated to the D2D communications link, thereby obtaining similar performances by the two methods.

However, when the distance between the D2D terminal and the cellular terminal is within 2 km, the inference applied to the D2D link is gradually increased, the curve LTE-D2D shows sharp deterioration. In contrast, when the distance between the D2D terminal and the cellular terminal is within 2 km, the curve D2D+Unlicense shows a decrease in the D2D communications level, but further alleviated slope and maintenance to a certain communications performance level.

Accordingly, the D2D system using the non-licensed band as an auxiliary resource, suggested in the present invention can relieve sharp deterioration of D2D performance depending on variations of the distance between the D2D terminal and the cellular terminal to secure stable communications performance.

As such, according to the exemplary embodiment of the present invention, it is possible to reduce the performance deterioration of the D2D communications caused by temporal interference increase by using the resources of the non-licensed band as an auxiliary band, thereby increasing transmission speed of the D2D communications, service coverage, data processing capacity, and the like.

Further, the D2D communications according to the exemplary embodiment of the present invention can be used for a relay between terminals while improving a frequency-using efficiency, and can stably provide new proximity-based services such as for collecting information related to stores and thinks located within an adjacent distance, for precise indoor measurement, for group communications between persons located within the adjacent distance, for network games, for location-based advertisements, for communications between vehicles, or disaster communications.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A resource allocating method of a LTE-advanced based D2D communications system including a plurality of D2D terminals, the method comprising: by the D2D terminals,
    requesting a base station to allocate a licensed band and searching for a spectrum for usable non-licensed bands;
    generating a D2D communications link by using a resource of the licensed band that is allocated from the base station;
    calculating a signal to interference and noise ratio (SINR) of the D2D communications link;
    selecting at least one of resources of the searched non-licensed band when the signal to interference and noise ratio (SINR) is smaller than a threshold value; and
    performing D2D communications by using a resource of the selected non-licensed band, wherein the resource of the licensed band that is allocated to the D2D terminal is an $n^{th}$ cellular resource and is represented by a following equation:

$$k^* = \text{argmax } SINR_{RX}(k)$$

wherein k* is a cellular resource which is allocated to the D2D terminal, argmax is a variable that accomplishes a maximum value, $SINR_{Rx}(k)$ is the signal to interference and noise ratio of a D2D receiving terminal which re-uses the $n^k$ cellular resource.

2. The method of claim 1, wherein, in the calculating, the signal to interference and noise ratio (SINR) of the D2D receiving terminal that re-uses the $n^k$ cellular terminal is calculated through a following equation:

$$SINR_{RX}(k) = \frac{H_D(k)d_D^{-a}P_D}{N + H_C(k)d_C^{-a}(k)P_C}$$

wherein $P_C$ indicates a transmission power of a cellular terminal, $P_D$ indicates a transmission power of the D2D terminal, $H_D$ and $d_D^{-a}$ respectively indicate a D2D channel coefficient and a path loss, If $H_C$ and $d_C^{-a}$ respectively indicate a channel coefficient and a path loss between the D2D terminal and the cellular terminal, and N indicates a noise power.

3. The method of claim 2, wherein the D2D terminal continuously calculates the signal to interference and noise ratio (SINR) of the D2D communications link while performing communications by selecting and using a non-licensed band, and
    when the SINR of the communications link of the D2D terminal calculated for a predetermined time or a predetermined number of times is equal to or greater than a threshold value, the D2D terminal performs D2D communications by using the resource of the licensed band that is allocated from the base station.

4. The method of claim 2, wherein, when the SINR of the communications link of the D2D terminal calculated for the predetermined time or the predetermined number of times is smaller than the threshold value, the D2D terminal performs D2D communications by requesting the base station to allocate a new licensed band and using the new allocated licensed band.

5. A LTE-advanced based D2D communications system including a plurality of D2D terminals, the system comprising:
    one or more computer-executable units being configured and executed by a processor using algorithms associated with at least one non-transitory storage device, the algorithms, when executed, causing the processor to execute the one or more computer-executable units, the one or more computer-executable units comprising,
    a resource collector unit configured to search for spectrums of usable non-licensed bands while the D2D terminals request a base station to allocate a licensed band to be used;
    a link generator unit configured to generate a D2D communications link by using a resource of the licensed band that is allocated from the base station;
    a calculator unit configured to calculate a signal to interference and noise ratio (SINR) of the D2D communications link;
    a resource selector unit configured to select at least one of resources of the searched non-licensed bands when the signal to interference and noise ratio (SINR) of the D2D communications link is smaller than a threshold value; and
    a communications unit configured to perform D2D communications by using a resource of the selected non-licensed band, wherein the resource of the licensed band that is allocated to the D2D terminal is an $n^{th}$ cellular resource and is represented by a following equation:

$$k^* = \text{argmax } SINR_{RX}(k)$$

wherein k* is a cellular resource which is allocated to the D2D terminal, argmax is a variable that accomplishes a maximum value, $SINR_{RX}(k)$ is the signal to interference and noise ratio of a D2D receiving terminal which re-uses the $n^k$ cellular resource.

6. The system of claim 5, wherein, in the calculating, the signal to interference and noise ratio (SINR) of the D2D receiving terminal that re-uses the $n^k$ cellular terminal is calculated through a following equation:

$$SINR_{RX}(k) = \frac{H_D(k)d_D^{-a}P_D}{N + H_C(k)d_C^{-a}(k)P_C}$$

wherein $P_C$ indicates a transmission power of a cellular terminal, $P_D$ indicates a transmission power of the D2D terminal, $H_D$ and $d_D^{-a}$ respectively indicate a D2D channel coefficient and a path loss, $H_C$ and $d_C^{-a}$ respectively indicate a channel coefficient and a path loss between the D2D terminal and the cellular terminal, and N indicates a noise power.

7. The system of claim 6, wherein the D2D terminal continuously calculates the signal to interference and noise ratio (SINR) of the D2D communications link while performing communications by selecting and using a non-licensed band, and when the SINR of the communications link of the D2D terminal calculated for a predetermined time or a predetermined number of times is equal to or greater than a threshold value, the D2D terminal performs D2D communications by using the resource of the licensed band that is allocated from the base station.

8. The system of claim 6, wherein, when the SINR of the communications link of the D2D terminal calculated for the predetermined time or the predetermined number of times is smaller than the threshold value, the D2D terminal performs D2D communications by requesting the base station to allocate a new licensed band and using the new allocated licensed band.

* * * * *